(12) United States Patent
Kawata

(10) Patent No.: US 8,463,956 B2
(45) Date of Patent: Jun. 11, 2013

(54) DATA TRANSFER CONTROL APPARATUS

(75) Inventor: Atsushi Kawata, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/038,740

(22) Filed: Mar. 2, 2011

(65) Prior Publication Data

US 2011/0219152 A1 Sep. 8, 2011

(30) Foreign Application Priority Data

Mar. 4, 2010 (JP) ................................. 2010-047388

(51) Int. Cl.
*G06F 13/00* (2006.01)
(52) U.S. Cl.
USPC .............................................. 710/35; 710/33
(58) Field of Classification Search
None
See application file for complete search history.

(56) References Cited

U.S. PATENT DOCUMENTS

| 5,179,663 | A * | 1/1993 | Iimura | 710/35 |
| 6,038,632 | A * | 3/2000 | Yamazaki et al. | 710/260 |
| 6,119,176 | A | 9/2000 | Maruyama | |
| 6,173,356 | B1 * | 1/2001 | Rao | 711/5 |
| 6,336,159 | B1 * | 1/2002 | MacWilliams et al. | 710/105 |
| 6,535,449 | B2 | 3/2003 | Miyauchi | |
| 6,941,434 | B2 | 9/2005 | Uneyama et al. | |
| 7,165,151 | B2 * | 1/2007 | Ayukawa et al. | 711/149 |
| 7,698,473 | B2 * | 4/2010 | Yamazaki et al. | 710/22 |
| 7,757,016 | B2 * | 7/2010 | Kokubo et al. | 710/22 |
| 7,774,513 | B2 * | 8/2010 | Haneda et al. | 710/22 |
| 2003/0204652 | A1 * | 10/2003 | Saito et al. | 710/33 |
| 2004/0143690 | A1 * | 7/2004 | Mitsuishi | 710/107 |
| 2005/0193155 | A1 * | 9/2005 | Fujita | 710/111 |
| 2005/0223136 | A1 * | 10/2005 | Tanaka et al. | 710/22 |
| 2006/0212612 | A1 * | 9/2006 | Takamiya et al. | 710/24 |
| 2009/0235026 | A1 | 9/2009 | Kawata | |
| 2010/0131677 | A1 * | 5/2010 | Kawata | 710/6 |

FOREIGN PATENT DOCUMENTS

| JP | 1-305454 | 12/1989 |
| JP | 5-127780 | 5/1993 |
| JP | 5-151156 | 6/1993 |
| JP | 6-161891 | 6/1994 |
| JP | 6-187123 | 7/1994 |
| JP | 6-251170 | 9/1994 |
| JP | 2626568 | 4/1997 |
| JP | 11-53300 | 2/1999 |
| JP | 2000-105992 | 4/2000 |
| JP | 2000-259548 | 9/2000 |
| JP | 2000-305895 | 11/2000 |
| JP | 2001-188752 | 7/2001 |

(Continued)

*Primary Examiner* — Henry Tsai
*Assistant Examiner* — Jing-Yih Shyu
(74) *Attorney, Agent, or Firm* — Cooper & Dunham LLP

(57) ABSTRACT

In a data transfer control apparatus, a transfer start address and a transfer size are acquired from a peripheral circuit. A command is issued in response to an activation signal from the peripheral circuit. When data transfer is performed between the main memory unit and the peripheral circuit, completion of issuance of all of commands corresponding to the transfer start address and transfer size is detected. The transfer size is retained until the end of data transfer. A next command is issued prior to completion of data transfer for one command, and a next activation signal is received upon detection of completion of issuance of all of the commands corresponding to the one transfer start address and transfer size. Next transfer start address and transfer size are acquired upon detection of completion of issuance of all of the commands corresponding to the one transfer start address and transfer size.

2 Claims, 3 Drawing Sheets

FOREIGN PATENT DOCUMENTS

| | | |
|---|---|---|
| JP | 2002-509315 | 3/2002 |
| JP | 2002-229934 | 8/2002 |
| JP | 2002-351737 | 12/2002 |
| JP | 2002-366451 | 12/2002 |
| JP | 2003-99391 | 4/2003 |
| JP | 2003-263883 | 9/2003 |
| JP | 2004-145435 | 5/2004 |
| JP | 2004-280558 | 10/2004 |
| JP | 2005-326918 | 11/2005 |
| JP | 2006-172395 | 6/2006 |
| JP | 2007-228145 | 9/2007 |
| JP | 2008-234189 | 10/2008 |
| JP | 2009-217640 | 9/2009 |
| JP | 2010-128803 | 6/2010 |
| WO | WO01/01228 A1 | 1/2001 |

* cited by examiner

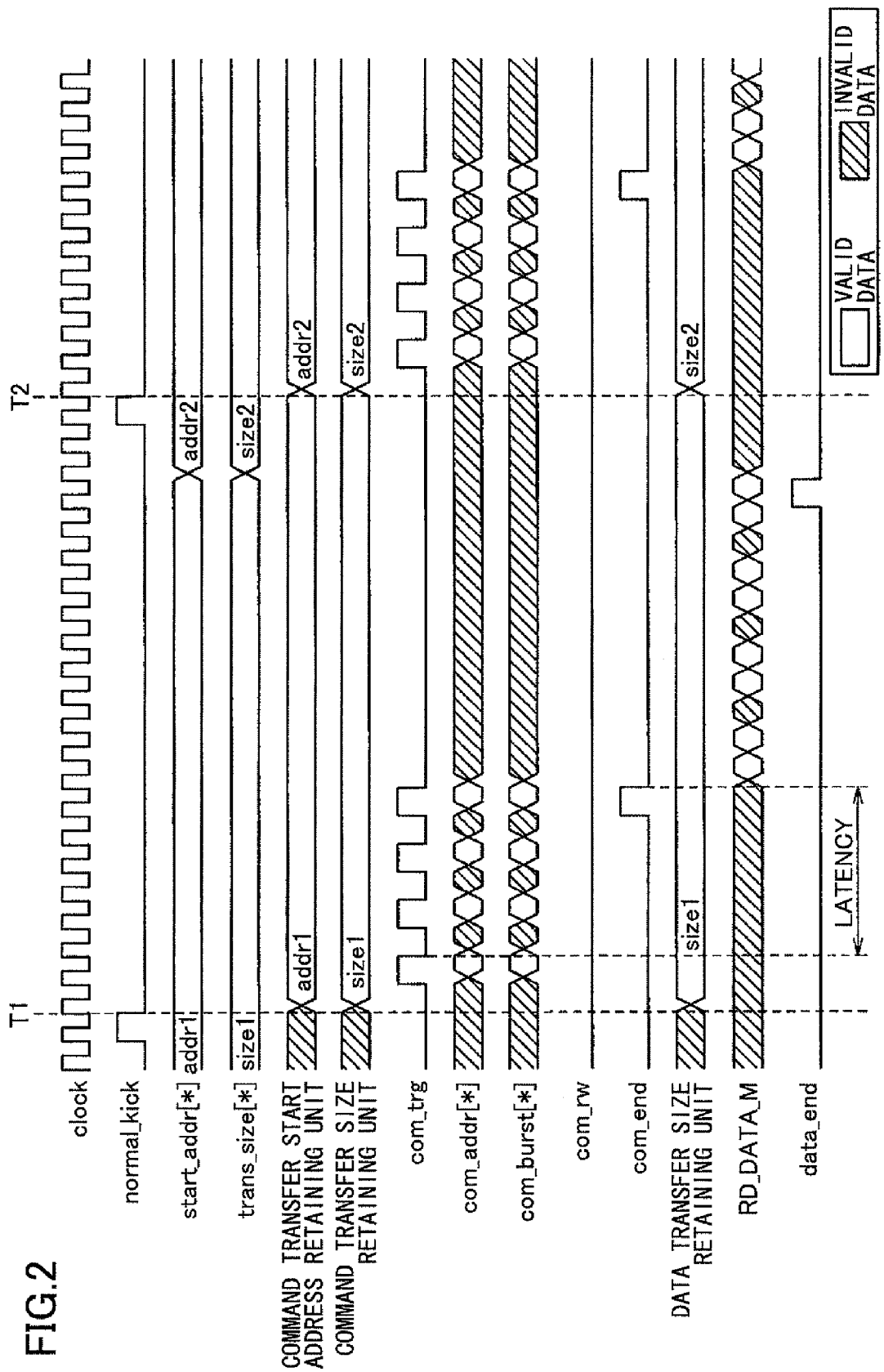

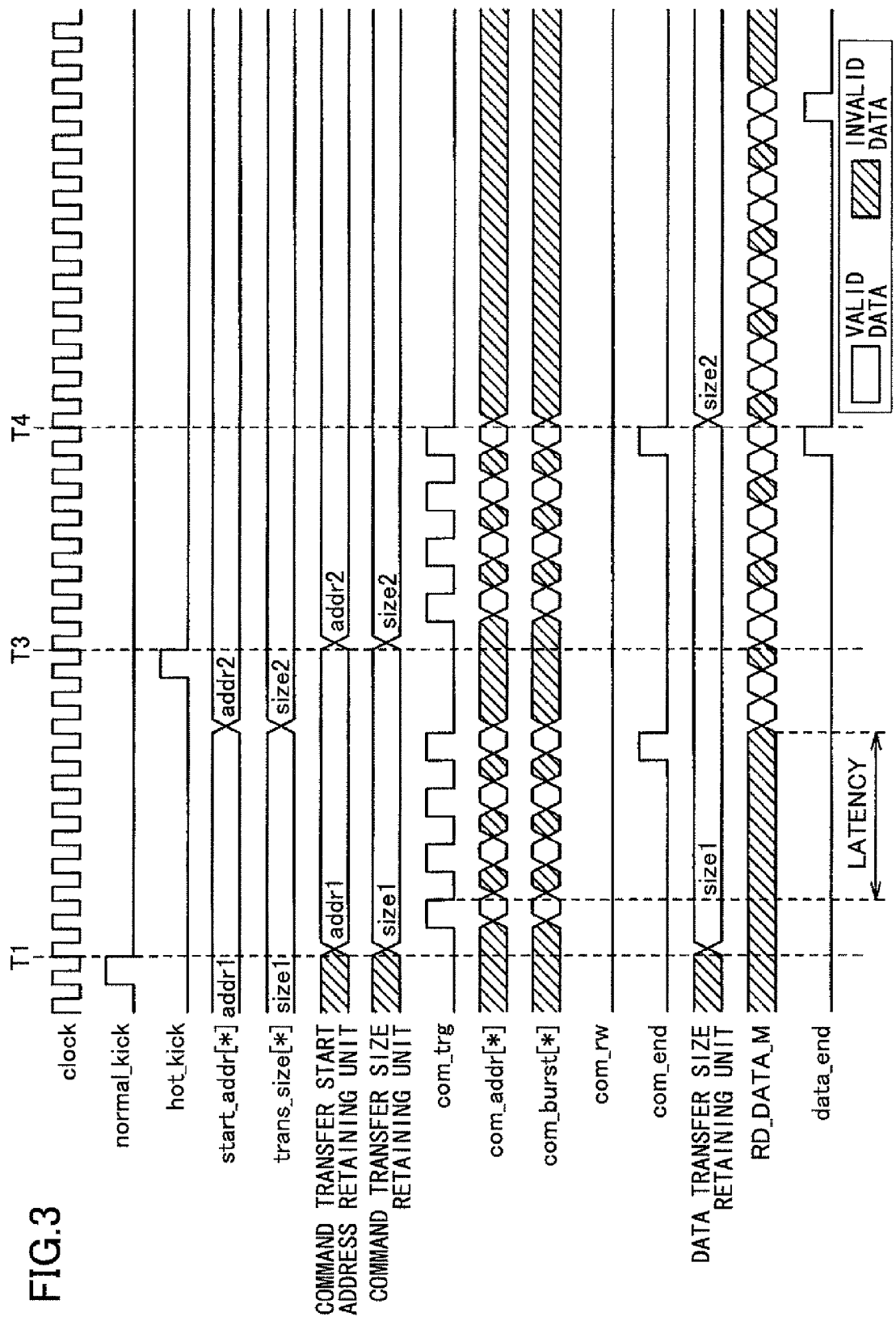

DATA TRANSFER CONTROL APPARATUS

BACKGROUND OF THE INVENTION

1. Technical Field

The present invention relates to data transfer control apparatuses, such as DMA controllers, for controlling transfer of data to or from a DRAM.

2. Description of the Related Art

When a DRAM (Dynamic Random Access Memory) and a peripheral device exchange data directly with each other, a DMA (Direct Memory Access) technology is often utilized. The DMA technology allows data transfer independently of a CPU (central processing unit). When DMA is activated after a transfer start address and a transfer number are designated, an entire transfer is divided into units referred to as "commands" that designate an address, a data transfer direction, and a burst number which are optimized for the DRAM, and repeats the issuance of the commands and data transfer until the designated transfer number is reached. It is known that a certain delay (latency) is caused between command issuance and completion of data transfer. In recent years, a DMA controller (DMAC) has been proposed whereby, in order to prevent the decrease in bus utilization efficiency due to the delay, the phase of the command and that of data are separated so that the command can be issued beforehand.

For example, Japanese Laid-Open Patent Publication No. 2009-217640 (which may be hereafter referred to as "Patent Document 1") discusses a data transfer control apparatus (DMAC) having a cache memory and capable of prior issuing of command. In this DMAC, it is determined whether data corresponding to an inputted address exists in the cache memory, so that the number of times of access to the DRAM can be reduced and data transfer efficiency can be improved. In this DMAC with the prior command issuing function, however, there still remains the problem of a long delay time between the issuance of a first command after activation of DMA and the acquisition of data by accessing the DRAM. As a result, bus utilization efficiency cannot be sufficiently increased when DMA is activated a number of times.

Thus, while Patent Document 1 attempts to improve data transfer efficiency by reducing the number of times of access to the DRAM in the DMAC having a cache memory, the problem of a long delay time between the issuance of the first command after activation of DMA and the acquisition of data by accessing the DRAM remains unresolved.

SUMMARY OF THE INVENTION

In one aspect of the present invention, a data transfer control apparatus includes a transfer information retaining unit configured to retain a transfer start address and a transfer size acquired from a peripheral circuit; a command issuing unit configured to issue a command based on the transfer start address and the transfer size retained in the transfer information retaining unit, in response to one activation signal inputted from the peripheral circuit, the command including an address of a main memory unit, a burst number, and a transfer direction; a data transfer unit configured to perform data transfer between the main memory unit and the peripheral circuit; a command issuance completion detection unit configured to detect completion of issuance of all of commands corresponding to one transfer start address and one transfer size; and a data transfer size retaining unit configured to retain the one transfer size until the end of data transfer by the data transfer unit corresponding to one data transfer. The command issuing unit is configured to issue a next command without waiting for completion of data transfer for one command, and configured to receive a next activation signal upon detection of completion of issuance of all of the commands corresponding to the one transfer start address and the one transfer size by the command issuance completion detection unit. The transfer information retaining unit is configured to acquire a next transfer start address and a next transfer size upon detection of completion of issuance of all of the commands corresponding to the one transfer start address and the one transfer size by the command issuance completion detection unit.

BRIEF DESCRIPTION OF THE DRAWINGS

FIG. 2 is a timing chart of an operation of the DMA controller of FIG. 1 where prior activation is not employed; and FIG. 3 is a timing chart of an operation of the DMA controller of FIG. 1 where prior activation is employed.

DETAILED DESCRIPTION OF THE PREFERRED EMBODIMENTS

Figure 1:
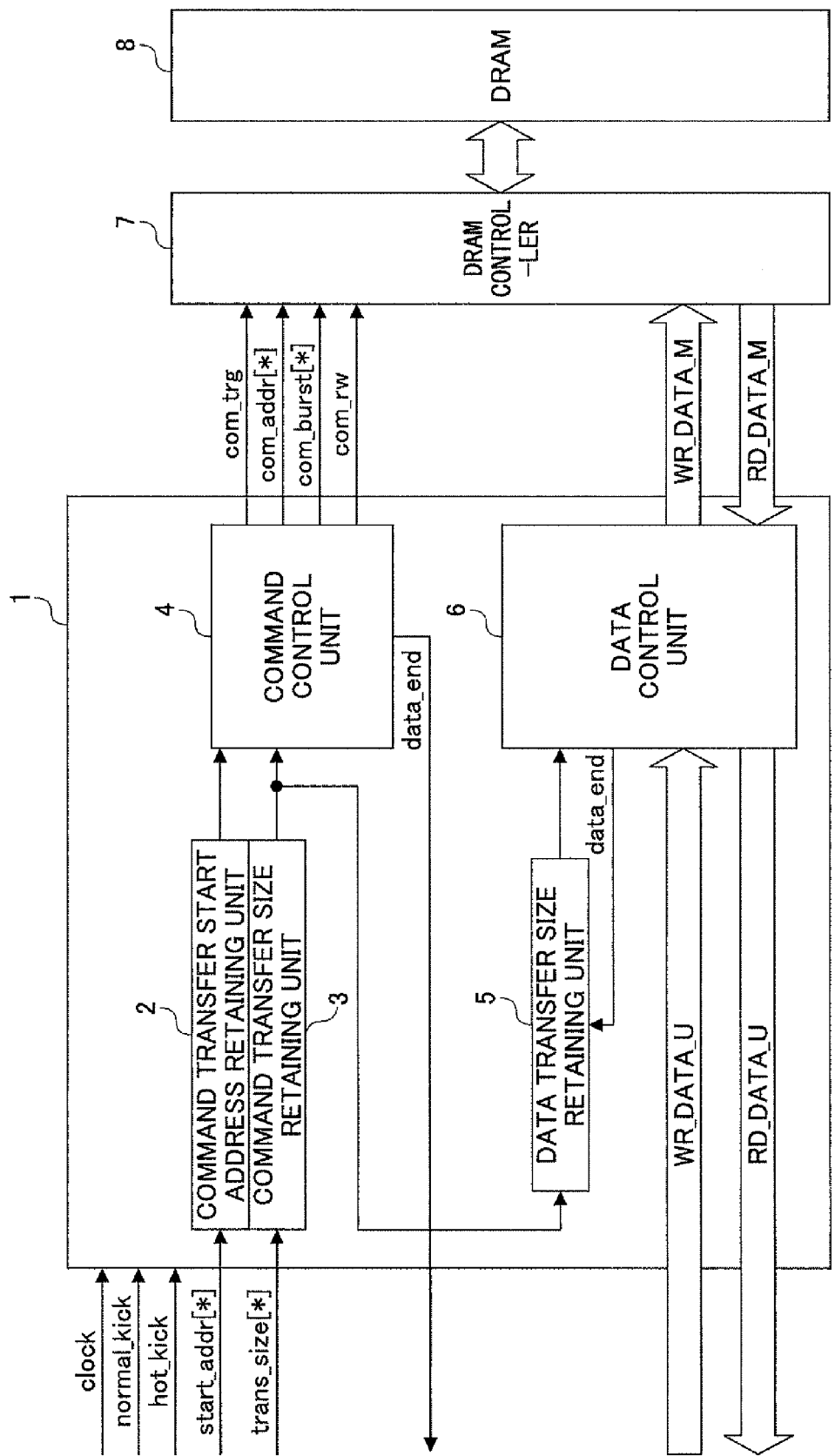
FIG. 1 illustrates a DMA controller according to an embodiment of the present invention.

FIG. 1 illustrates a DMA controller (DMAC) 1 as a data transfer control apparatus according to an embodiment of the present invention. The DMAC 1 includes a command transfer start address retaining unit 2, a command transfer size retaining unit 3, a command control unit 4, a data transfer size retaining unit 5, and a data control unit 6. The designation "(signal name) [*]" indicates a bus signal.

The command transfer start address retaining unit 2, which is a transfer information retaining unit, retains a "start_addr" signal acquired from a peripheral circuit (not shown), indicating a transfer start address for DMA transfer, in response to a DMA activation signal ("normal_kick" or "hot_kick") as a trigger. The command transfer size retaining unit 3, which is another transfer information retaining unit, retains a "trans_size" signal acquired from the peripheral circuit (not shown) indicating a transfer size for DMA transfer, in response to the DMA activation signal ("normal_kick" or "hot_kick") as a trigger.

The command control unit 4, which may include a command issuing unit and a command issuance completion detection unit, generates a command for a DRAM 8 as a main memory unit from the transfer start address retained in the command transfer start address retaining unit 2 and the transfer size retained in the command transfer size retaining unit 3, in response to the DMA activation signal ("normal_kick" or "hot_kick") as a trigger, and then outputs the command to the DRAM controller 7. The command includes a command issuance signal ("com_trg"), a memory address ("com_addr"), a burst number ("com_burst"), and a transfer direction ("com_rw"; 0: read, 1: write).

The command control unit 4 may issue a next command before data transfer corresponding to one command is completed. The command control unit 4 outputs a command issuance completion signal ("com_end") to the peripheral circuit after outputting all of commands for the data transfer corresponding to one DMA activation signal.

The data transfer size retaining unit 5 acquires and retains the transfer size retained by the command transfer size retaining unit 3 in response to the DMA activation signal ("normal_kick") or a data transfer completion signal ("data_end") outputted by the data control unit 6 as a trigger. When the DMAC 1 is activated by the normal_kick signal as the DMA activation signal, the data transfer size retaining unit 5 acquires the transfer size in response to the normal_kick signal. When the DMAC 1 is activated by the hot_kick signal as the DMA activation signal, the data transfer size retaining unit 5 acquires the transfer size in response to the data_end signal.

The data control unit 6, which is a data transfer unit, may output data read from the DRAM 8 via the DRAM controller 7 to the peripheral circuit (not shown) using a RD_DATA_U signal, or output data inputted from the peripheral circuit to the DRAM controller 7 using a WR_DATA_M signal. When data transfer for the DMA activation signal is completed, the data control unit 6 outputs a data transfer completion signal ("data_end").

The DRAM controller 7, based on the command inputted from the DMAC 1, may control read or write in the DRAM 8, output the data read from the DRAM 8 to the DMAC 1 using a RD_DATA_M signal, or output data inputted from the DMAC 1 using a WR_DATA_M signal as write data in the DRAM 8. The DRAM 8 is a memory in which read and write are controlled by a command outputted by the DRAM controller 7. The DRAM 8 may include a DDR SDRAM (Double-Data-Rate Synchronous DRAM).

An operation of the DMAC 1 when prior activation is not used (normal operation) is described with reference to a timing chart of FIG. 2. The timing chart shows, from top, an input clock signal "clock" of the DMAC 1; a DMA activation signal "normal_kick" inputted from the peripheral circuit as a first activation signal; a transfer start address "start_addr[*]" inputted from the peripheral circuit; a transfer size signal "trans_size[*]" inputted from the peripheral circuit; the command transfer start address retaining unit 2; the command transfer size retaining unit 3; a command issuance signal "com_trg" outputted to the DRAM controller 7; a memory address signal "com_addr[*]" of the command outputted to the DRAM controller 7; a burst number signal "com_burst[*]" of the command outputted to the DRAM controller 7; a transfer direction signal "com_rw" of the command outputted to the DRAM controller 7; a command issuance completion signal "com_end"; the data transfer size retaining unit 5; a data signal "RD_DATA_M" read from the DRAM 8 via the DRAM controller 7; and a data transfer completion signal "data_end".

In the timing chart of FIG. 2, when the normal_kick signal is inputted to the DMAC 1 and DMA activation is performed at time T1, the start_addr signal and the trans_size signal are acquired by the command transfer start address retaining unit 2 and the command transfer size retaining unit 3, respectively. Then, the command control unit 4 starts generating and issuing a command based on the values of the command transfer start address retaining unit 2 and the command transfer size retaining unit 3.

The command is issued (i.e., a valid command is outputted to the DRAM controller 7) when the com_trg signal is "H". In the example of FIG. 2, the command is issued four times with a single DMA activation. Upon command issuance, the com_addr signal, the com_burst signal, and the com_rw signal are also outputted. A next command may be issued without waiting for a data response to a previous command. In the example of FIG. 2, the second through fourth commands are issued before the RD_DATA_M signal corresponding to the first command is inputted. Upon issuance of the last command, the com_end signal is asserted. In response to the issued command, read data ("RD_DATA_M") is inputted from the DRAM controller 7 after a predetermined period of latency. The example of FIG. 2 indicates the case of two bursts, where two items of data are transferred for a single command. The data_end signal is asserted in synchronism with the last data of the single DMA activation.

At the end of the first activation, the start_addr signal and the trans_size signal for the next transfer are inputted, and the normal_kick signal is again asserted at time T2, thus enabling DMA activation.

An operation of the DMAC 1 when prior activation is used is described with reference to a timing chart of FIG. 3. The timing chart of FIG. 3 differs from that of FIG. 2 in that a DMA activation signal "hot_kick" is added as a second activation signal inputted from the peripheral circuit. The hot_kick signal, which indicates DMA activation as does the normal_kick signal, is a signal (prior activation signal) for DMA activation for the next transfer without waiting for assertion of the data_end signal for the first DMA activation.

In the timing chart of FIG. 3, the first transfer is similar to that of FIG. 2. A difference from the timing chart of FIG. 2 is that the start_addr signal and the trans_size signal for the next transfer are inputted upon assertion of the com_end signal for the first transfer and the hot_kick signal is asserted at time T3. Namely, the hot_kick signal is a signal used for activating the next transfer after completion of issuance of all of commands corresponding to the preceding transfer and before completion of the corresponding data transfer.

When the hot_kick signal is asserted, the DMAC 1, without waiting for the data_end signal for the preceding transfer, updates the command transfer start address retaining unit 2 and the command transfer size retaining unit 3, and also operates the command control unit 4 to start command issuance. Namely, upon detection of command issuance completion, the DMAC 1 acquires the next transfer start address and transfer size and receives the next DMA activation signal.

The data control unit 6 continues the transfer of data for the preceding transfer without updating the data transfer size retaining unit 5 because the data transfer for the preceding transfer is not yet completed upon assertion of the hot_kick signal. Thus, the transfer size is retained until the end of data transfer by the data control unit 6. Upon assertion of the com_end signal at time T3, the data transfer size retaining unit 5 is updated for the next transfer, and then data transfer is started. Because the corresponding command has already been issued by this time, the time at which the RD_DATA_M signal is inputted from the DRAM controller 7 becomes earlier than in the case of normal activation.

Comparison of FIGS. 2 and 3 shows that the period of invalid data in the RD_DATA_M signal between the first and second activations is clearly shorter in FIG. 3, thus indicating an improvement in bus transfer efficiency.

It is an aim of the present embodiment to decrease the invalid period of data between command issuance and start of data transfer for a second activation. Thus, the smaller the transfer size per activation, the greater the effect. The ratio of improvement in transfer efficiency may be estimated from the ratio of latency period and the period between start and completion of data transfer. For example, when the latency period is 1 μs and the data transfer period is 10 μs, an improvement of about 10% in transfer efficiency can be expected because a decrease approximately corresponding to the latency period can be achieved by utilizing the prior activation mechanism according to the present embodiment of the present invention.

The update timings of the data transfer size retaining unit 5 are different between the normal_kick signal and the hot_kick signal, as mentioned above. Thus, the peripheral circuit may determine whether DMA transfer is activated and perform DMA activation based on one or the other DMA activation signal.

In accordance with the present embodiment, when the DMAC 1 performs DMA transfer, the prior activation signal "hot_kick" is asserted for activating DMA for the next transfer upon assertion of the com_end signal indicating completion of command issuance to the DRAM 8 for the preceding transfer. The data transfer size retaining unit 5 is updated for the next transfer upon assertion of the data_end signal for the preceding transfer. Thus, after activation of DMA, DMA for the next transfer is activated after completion of issuance of all of commands for the preceding transfer without waiting for completion of data acquisition from the DRAM 8. Thus, data bus utilization efficiency can be increased.

In the foregoing embodiment, the start_addr signal and the trans_size signal for the next transfer are inputted upon assertion of the com_end signal. Alternatively, the start_addr signal and the trans_size signal for the next transfer may be inputted after assertion of the normal_kick signal or the hot_kick signal (such as one clock later). Namely, the start_addr signal and the trans_size signal for the next transfer may be inputted in the period between immediately after the input of the DMA activation signal and command issuance completion.

Thus, in accordance with an embodiment of the present invention, upon detection of completion of issuance of all of commands corresponding to one transfer start address and transfer size by a command issuance completion detection unit, a command issuing unit receives a next activation signal and a transfer information retaining unit acquires transfer start address and transfer size. Thus, after activation by one activation signal, the command issuing unit can receive the next activation signal for a second transfer and perform a command issuing operation after completion of issuance of all of the commands corresponding to the one transfer start address and transfer size without waiting for the completion of acquisition of data from a main memory unit. Thus, data bus utilization efficiency can be increased.

In accordance with another embodiment of the present invention, the one transfer start address and transfer size can be inputted in a period between immediately after the input of the one activation signal and completion of issuance of all of commands corresponding to the one transfer start address and transfer size detected by the command issuance completion detection unit. Thus, the period in which the transfer start address and transfer size can be set can be increased, so that data transfer control, such as DMAC timing control, can be facilitated.

In accordance with another embodiment of the present invention, the activation signal includes a first activation signal used for activation after completion of data transfer by the data transfer unit and a second activation signal used for activation after completion of issuance of all of commands corresponding to a transfer start address and a transfer size detected by the command issuance completion detection unit. Thus, the first or the second activation signal can be selected depending on whether DMA is activated.

Although this invention has been described in detail with reference to certain embodiments, variations and modifications exist within the scope and spirit of the invention as described and defined in the following claims.

The present application is based on Japanese Priority Application No. 2010-047388 filed Mar. 4, 2010, the entire contents of which are hereby incorporated by reference.

What is claimed is:

1. A data transfer control apparatus comprising:
a command transfer start address retaining unit and a command transfer size retaining unit configured to retain a transfer start address and a transfer size, respectively, acquired from a peripheral circuit;
a command control unit configured to issue a command based on the transfer start address and the transfer size retained in the command transfer start address retaining unit and the command transfer size retaining unit, in response to an activation signal inputted from the peripheral circuit, the command including an address of a main memory unit, a burst number, and a transfer direction; and
a data control unit configured to perform data transfer between the main memory unit and the peripheral circuit,
wherein the command control unit is configured to detect completion of issuance of all of commands corresponding to the transfer start address and the transfer size; and
a data transfer size retaining unit configured to retain the transfer size until the end of data transfer by the data control unit corresponding to one data transfer of the activation signal;
wherein the command control unit is configured to issue a next command without waiting for completion of data transfer for one command, and configured to receive a next activation signal upon detection of completion of issuance of all of the commands corresponding to the transfer start address and the transfer size, and
wherein the command transfer start address retaining unit and the command transfer size retaining unit are configured to acquire a next transfer start address and a next transfer size, respectively, upon detection of completion of issuance of all of the commands corresponding to the transfer start address and the transfer size by the command control unit, and
wherein the transfer start address and the transfer size are inputted in a period between immediately after the input of the activation signal and completion of issuance of all of the commands corresponding to the transfer start address and the transfer size as detected by the command control unit.

2. The data transfer control apparatus according to claim 1, wherein the activation signal includes a first activation signal used for activation of a data transfer operation after completion of data transfer by the data control unit, and a second activation signal used for activation of the data transfer operation after completion of issuance of all of the commands corresponding to the transfer start address and the transfer size as detected by the command control unit.

* * * * *